March 15, 1932.　　J. H. TROMANHAUSER　　1,849,389

OVER-RUNNING CLUTCH

Filed June 6, 1931

Inventor
J. H. Tromanhauser
by J. Edw. Maybee
ATTY.

Patented Mar. 15, 1932

1,849,389

UNITED STATES PATENT OFFICE

JESSE H. TROMANHAUSER, OF TORONTO, ONTARIO, CANADA

OVER-RUNNING CLUTCH

Application filed June 6, 1931. Serial No. 542,547.

This invention relates to over-running friction clutches particularly adapted for use in free-wheel automobile transmission gears, and my object is to devise a clutch of this type in which the frictionally engaging surfaces of the driving and driven parts are of large area, which will provide quick grip and quick release and in which any wedging parts may be made of ample size for the load transmitted.

I attain my object by means of a construction which may be briefly described as follows. The driven shaft carries a drum having an internal annular friction surface. Within this drum are positioned two clutch shoes having their ends spaced apart and formed with wedging surfaces diverging inwardly. Between these ends are positioned wedging members, radially movable and which may be slidable in guides formed on a hub loose on the driving shaft. On the end of the driving shaft is formed a cam adapted to engage the wedging members when the shaft is rotated to push them outwardly to wedge apart the ends of the clutch shoes and force the latter into tight engagement with the drum.

Figure 1:
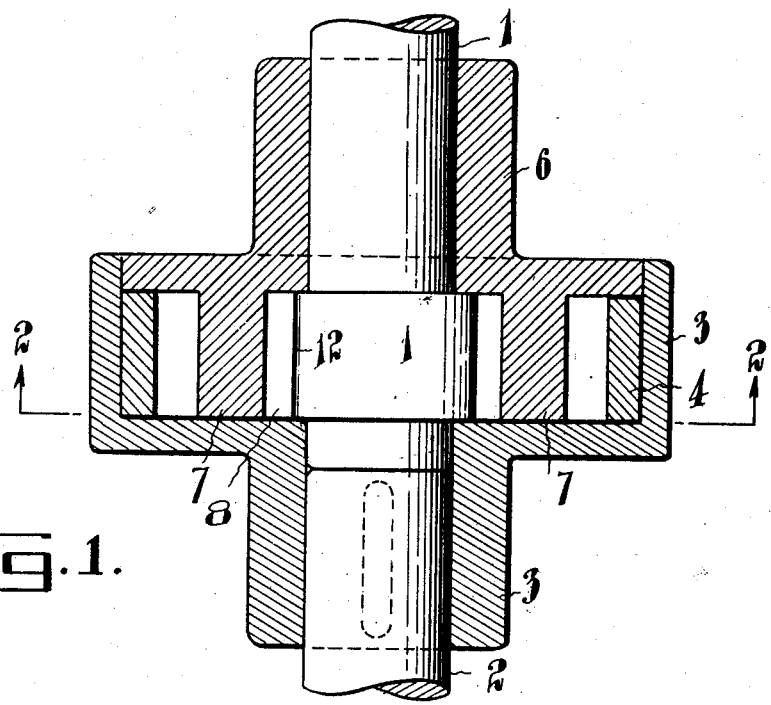
Figure 2:
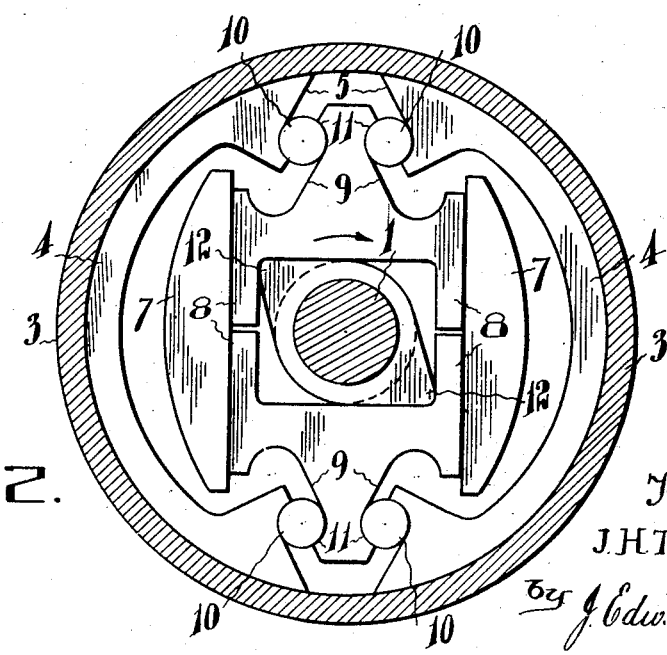

The invention is hereinafter more specifically described and is illustrated in the accompanying drawings in which Fig. 1 is a longitudinal section of my improved clutch; and Fig. 2 a section on the line 2—2 in Fig. 1.

In the drawings like numerals of reference indicate corresponding parts in the different figures.

In the drawings 1 is the drive shaft and 2 the driven shaft which are arranged in alinement. To the shaft 2 is secured the drum 3, the inner periphery of which forms a friction surface. Positioned within the drum are a plurality of rigid clutch shoes 4 having wedging surfaces 5 formed at their ends for engagement with the wedging members operable by the drive shaft. The drive shaft is journalled in a hub 6, which has guideways 7 formed thereon extending within the drum 3.

The wedging members hereinbefore referred to are each formed of a part 8 slidably engaging the guideways 7 and provided with wedging surfaces 9 opposed to the wedging surfaces of the shoes. Anti-friction rollers 10 positioned between the opposed surfaces of the wedging members and the clutch ends form the contacts between the wedging members and the clutch shoes. Preferably the wedging surfaces of the clutch shoe and the wedging members are formed with shoulders 11 limiting the radial movements of the rollers. The wedging members are actuated by the cams 12 formed on or secured to the end of the drive shaft. It is evident that by rotating the shaft the wedging members may be separated to wedge the rollers 10 between the wedging surfaces 5 and 9, thus spreading the ends of the clutch shoes and forming a frictional driving engagement between the shoes and the drum 3. It is evident then that, if the drive shaft be rotated in the direction indicated by the arrow, a driving engagement is automatically formed between the driving and driven shafts. If, however, the driven shaft overruns the drive shaft, the wedging members are released and the clutch shoes contact and release their grip on the friction surface of the drum.

Various modifications are possible which would fall within the scope of my invention, the principle of which is the use of radially movable wedging members to spread the ends of the clutch shoes and thus cause them to grip against the friction surfaces of the drum secured to the driven shaft.

What I claim as my invention is:

In a friction clutch, the combination of a driven shaft; a drum secured thereto formed with an annular internal friction surface; clutch shoes engaging the said surface having their ends spaced apart and formed with wedging surfaces diverging inwardly; a hub concentric with the driven shaft and formed with radial guides; wedging members, each comprising a part movable in said guides provided with wedging surfaces opposed to the wedging surfaces of the shoes and rollers interposed between the opposed surfaces; a drive shaft; and cams on the drive shaft adapted, when the said shaft is driving, to engage the wedging members and force them outwardly to spread the clutch shoes.

Signed at Toronto, Canada, this 19th day of May, 1931.

JESSE H. TROMANHAUSER.